US012780461B2

(12) United States Patent
Park et al.

(10) Patent No.: US 12,780,461 B2

(45) Date of Patent: Nov. 3, 2026

(54) APPARATUS FOR DISCHARGING POWDER FOR SECONDARY BATTERY

(71) Applicant: SK On Co., Ltd., Seoul (KR)

(72) Inventors: Moo Jin Park, Daejeon (KR); In Mok Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 146 days.

(21) Appl. No.: 18/796,311

(22) Filed: Aug. 7, 2024

(65) Prior Publication Data

US 2025/0058909 A1 Feb. 20, 2025

(30) Foreign Application Priority Data

Aug. 18, 2023 (KR) ........................ 10-2023-0108126

(51) Int. Cl.

*B65B 1/08* (2006.01)
*H01M 4/587* (2010.01)
*H01M 4/02* (2006.01)

(52) U.S. Cl.

CPC ............... *B65B 1/08* (2013.01); *H01M 4/587* (2013.01); *H01M 2004/027* (2013.01)

(58) Field of Classification Search

CPC ... B65B 1/08; H01M 4/587; H01M 2004/027; H01M 4/04; H01M 10/00; Y02E 60/10; B65D 88/66; B65D 88/64; B01F 35/892; B01F 35/2117; B01F 35/214; B01F 35/22; B01F 35/71731; B01F 35/718051; B01F 35/79; B01F 35/8821; B01F 2101/59

See application file for complete search history.

(56) References Cited

U.S. PATENT DOCUMENTS 3,591,001 A * 7/1971 Quesnel .................... B07B 1/18 209/407
6,079,911 A * 6/2000 Wangermann ...... B01F 35/1453 406/48
6,299,021 B1 * 10/2001 Haas ....................... B41F 23/06 222/64

(Continued)

FOREIGN PATENT DOCUMENTS

JP H8-133474 A 5/1996
KR 10-2010-0034867 A 4/2010

(Continued)

OTHER PUBLICATIONS

KR1020210074570 with Machine Translation (Year: 2021).*
Office Action for Korean Patent Application No. 10-2023-0108126 issued by the Korean Patent Office on Apr. 11, 2025.

*Primary Examiner* — Vishal Pancholi
(74) *Attorney, Agent, or Firm* — IP&T GROUP LLP

(57) ABSTRACT

The present disclosure provides an apparatus for discharging powder for a secondary battery, the apparatus comprising: a hopper having an accommodating space in which powder is accommodated and a discharge port through which the powder is discharged, a mesh plate disposed inside the hopper, and a vibration transmission unit transmitting vibrations to the mesh plate and a controller controlling driving of the vibration transmission unit; wherein the controller receives a measurement value from a measurement sensor measuring a weight of the powder accommodated in the hopper and operates the vibration transmission unit according to the measurement value.

14 Claims, 5 Drawing Sheets

(56) References Cited

U.S. PATENT DOCUMENTS

| | | | | |
|---|---|---|---|---|
| 2011/0114662 A1* | 5/2011 | Saunders | B65G 65/44 | 222/196 |
| 2016/0052719 A1* | 2/2016 | Ganzer | B29B 13/022 | 198/752.1 |

FOREIGN PATENT DOCUMENTS

| | | | |
|---|---|---|---|
| KR | 10-2012-0121017 | A | 11/2012 |
| KR | 10-1819468 | B1 | 1/2018 |
| KR | 10-2020-0053853 | A | 5/2020 |
| KR | 10-2021-0074570 | A | 6/2021 |
| KR | 10-2021-0155952 | A | 12/2021 |

* cited by examiner

APPARATUS FOR DISCHARGING POWDER FOR SECONDARY BATTERY

CROSS-REFERENCE TO RELATED APPLICATIONS

This patent document claims the priority and benefits of Korean Patent Application No. 10-2023-0108126 filed on Aug. 18, 2023, the disclosure of which is incorporated herein by reference in its entirety.

TECHNICAL FIELD

The disclosure and implementations disclosed in this patent document generally relate to an apparatus for discharging powder for a secondary battery.

BACKGROUND

Unlike primary batteries, secondary batteries may be conveniently charged with and discharged of electricity, and thus have come to prominence as a power source for various mobile devices and electric vehicles. For example, a battery module may be formed by connecting a plurality of secondary batteries using a non-aqueous electrolyte with high energy density and may be used as a power source for an electric vehicle.

Lead secondary batteries, nickel cadmium secondary batteries, nickel hydride secondary batteries, and lithium ion secondary batteries have mainly been used as secondary batteries. Thereamong, lithium-ion secondary batteries are small and lightweight, have high energy density, and have excellent high-current load characteristics.

Lithium ion secondary batteries use lithium salts, such as lithium cobaltate, as a positive electrode active material, and use carbonaceous materials, such as graphite, as a negative electrode active material. Particulate graphite-based materials have been mainly used as carbon materials comprising negative electrodes of lithium-ion secondary batteries, and here, graphite has been mixed therewith to ensure both cost and structural stability.

In the related art, graphite has been introduced into a mixing device using a hopper. Due to the nature of graphite, graphite may cluster, and clustering of graphite may be more severe near a discharge port. If clustering of graphite is severe, powder may not be able to be input into the mixing device or the speed at which powder is introduced may be reduced, which may be problematic.

SUMMARY

The present disclosure may be implemented in some embodiments to provide an apparatus for discharging powder for a secondary battery, capable of reducing clustering of powder.

The present disclosure may be implemented in some embodiments to provide an apparatus for discharging powder for a secondary battery, capable of smoothly discharging powder.

In some embodiments of the present disclosure, an apparatus for discharging powder for a secondary battery includes: a hopper having an accommodating space in which powder is accommodated and a discharge port through which the powder is discharged; a mesh plate disposed inside the hopper; and a vibration transmission unit transmitting vibrations to the mesh plate and a controller controlling driving of the vibration transmission unit; wherein the controller receives a measurement value from a measurement sensor measuring a weight of the powder accommodated in the hopper and operates the vibration transmission unit according to the measurement value.

The apparatus may further include: at least one guide member disposed in the accommodating space and guiding a moving direction of the powder, wherein the at least one guide member is in contact with the mesh plate to receive vibrations from the mesh plate.

The at least one guide member may be disposed on both sides of the mesh plate.

The at least one guide member may be fixed to the mesh plate.

The at least one guide member may include an inclined portion formed on an external surface thereof to allow the powder to slide.

The at least one guide member may have a cone or truncated cone shape.

The at least one guide member may include stainless steel.

The hopper may include a tapered portion having an inner diameter that gradually narrows, and the discharge port may be disposed in a lower portion of the tapered portion.

The mesh plate may be disposed inside the tapered portion.

The tapered portion may be in contact with the vibration transmission unit.

The tapered portion may contact the mesh plate, and the vibration transmission unit may be disposed outside the hopper opposite to a position in which the mesh plate is disposed.

The vibration transmission unit and the mesh plate may be connected through a connection member, and the connection member may penetrate through a portion of the hopper.

The apparatus may further include a controller controlling driving of the vibration transmission unit.

The controller may receive a measurement value from a measurement sensor measuring a weight of the powder accommodated in the hopper and operate the vibration transmission unit according to the measurement value.

A valve opened and closed may be connected to the discharge port.

The mesh plate may be formed of stainless steel.

BRIEF DESCRIPTION OF DRAWINGS

Certain aspects, features, and advantages of the present disclosure are illustrated by the following detailed description with reference to the accompanying drawings.

DETAILED DESCRIPTION

Figure 1:
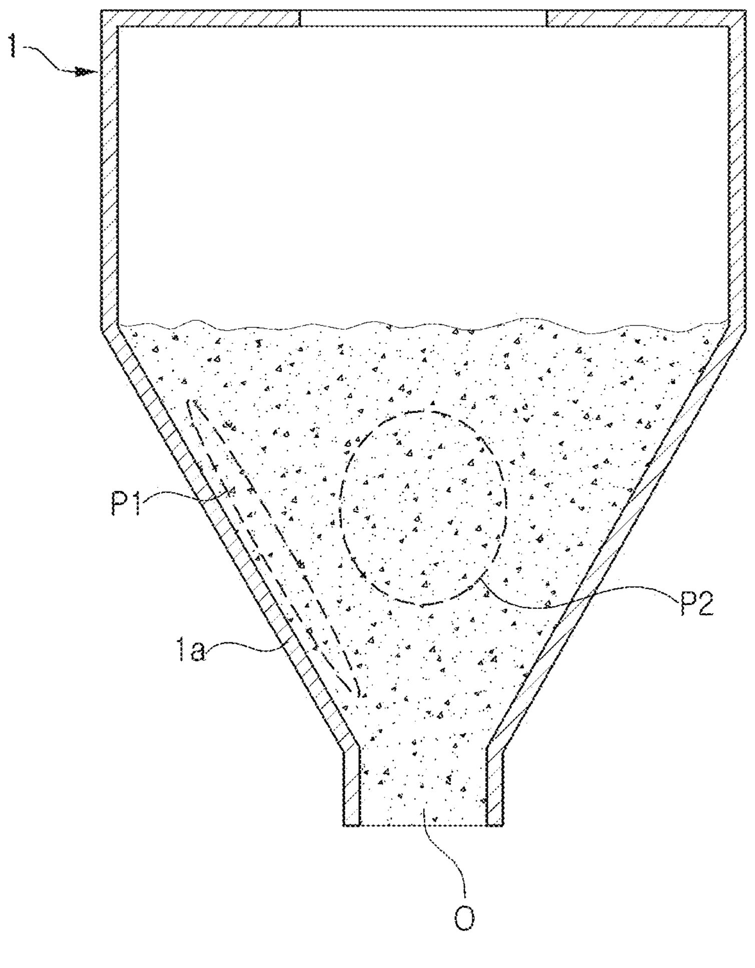
FIG. 1 is a cross-sectional view of the related art apparatus for discharging powder for a secondary battery.

Prior to the description of the present disclosure, terms and words used in the present specification and claims to be described below should not be construed as limited to ordinary or dictionary terms, and should be construed in accordance with the technical idea of the present disclosure based on the principle that the inventors may properly define their own inventions in terms of terms in order to best explain the invention. Therefore, the embodiments described in the present specification and the configurations illustrated in the drawings are merely the most preferred embodiments of the present disclosure and are not intended to represent all of the technical ideas of the present disclosure, and thus it should be understood that various equivalents and modifications may be substituted at the time of the present application.

As used herein, the singular forms are intended to include the plural forms as well, unless the context clearly indicates otherwise. It will be further understood that the terms "comprises," "comprising," etc. when used in this specification, specify the presence of stated features, integers, steps, operations, elements, and/or components, but do not preclude the presence or addition of one or more other features, integers, steps, operations, elements, components, and/or groups thereof.

In addition, in the present specification, the expressions, such as an upper side, a lower side, a side face, a rear surface, and the like, are described based on the drawings and may be expressed differently when the direction of the corresponding object is changed.

The terms including ordinal numbers, such as 'first,' 'second,' etc. may be used herein to distinguish elements from one another. These ordinal numbers are merely used to distinguish the same or similar elements from one another, and meanings of the terms are not construed as being limited by the use of ordinal numbers. For example, use orders or arrangement orders of elements combined with these ordinal numbers are not limited by numbers thereof. The ordinal numbers may be redisposed with one another.

Exemplary embodiments of the present disclosure will now be described in detail with reference to the accompanying drawings. However, the ideas of the present disclosure are not limited thereto and those skilled in the art who understand the ideas of the present disclosure may easily propose any other embodiments within the scope of the present disclosure and any other degenerative invention through addition, change, deletion, and the like, and those embodiments will also be within the scope of the present disclosure. Thus, in the drawings, the shapes and dimensions of elements may be exaggerated for clarity.

FIG. 1 is a cross-sectional view of a related art apparatus for discharging powder for a secondary battery.

Referring to FIG. 1, the related art apparatus for discharging powder for a secondary battery includes a hopper 1.

The hopper 1 may include an inclined surface 1*a* formed such that an inner diameter of the lower surface gradually narrows. Powder P1 near the inclined surface may slide downwardly in the hopper 1 along the inclined surface 1*a* and be discharged through the discharge port O formed at the bottom of the hopper 1. Meanwhile, the powder located relatively distantly from the inclined portion may move less than the powder P1 located near the inclined portion. For example, powder P2 located in the center of an internal space of the hopper is relatively stagnant than the powder P1 located near the inclined portion. Therefore, in the case of disposing graphite powder, the powder P2 located in the center of the internal surface of the hopper may cluster due to the nature of graphite that may easily cluster. If powder clusters, the speed at which powder is discharged through the discharge port O may slow down or the powder may not be discharged.

Figure 2:
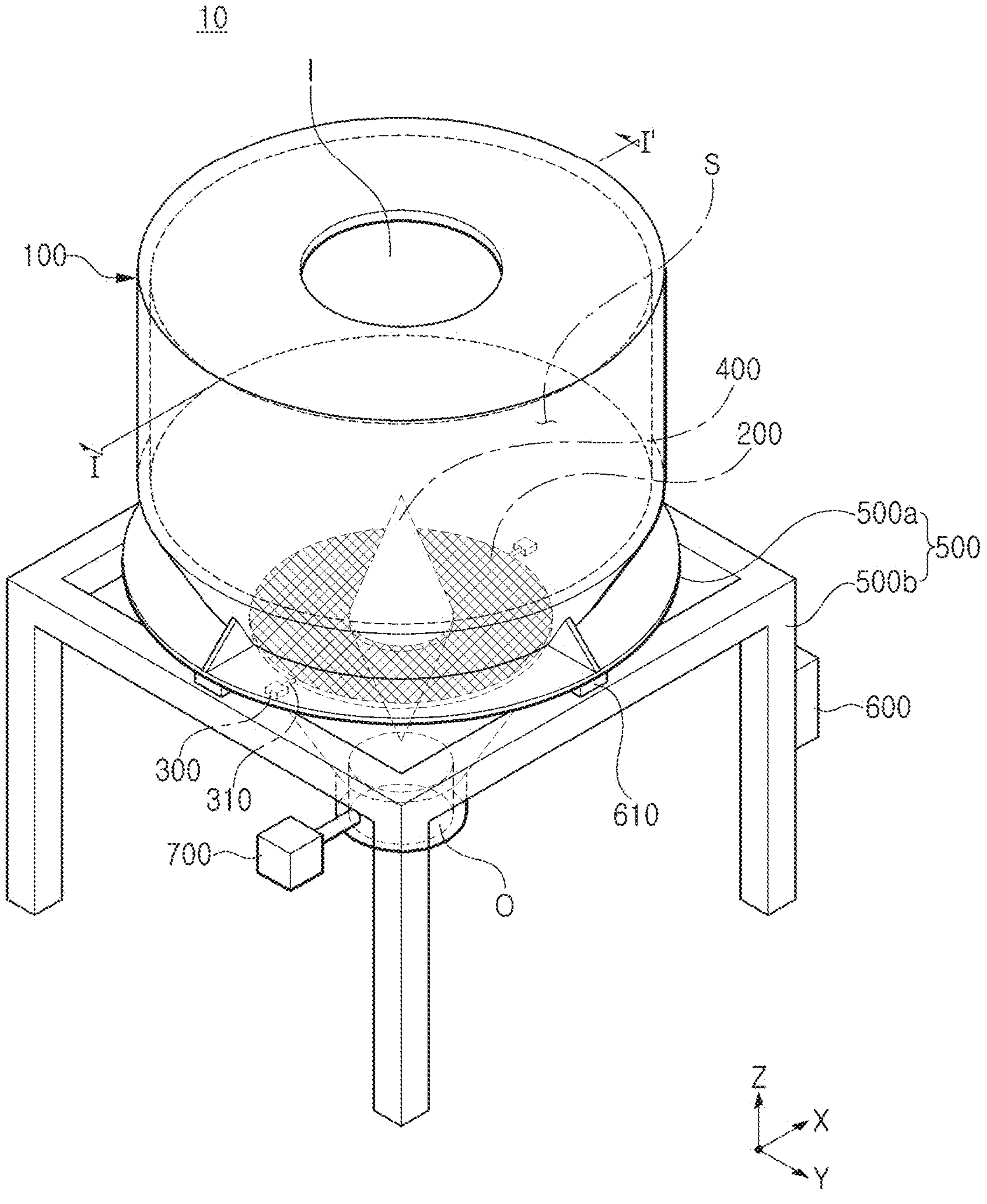
FIG. 2 is a perspective view of an apparatus for discharging powder for a secondary battery according to an embodiment of the present disclosure.
Figure 3:
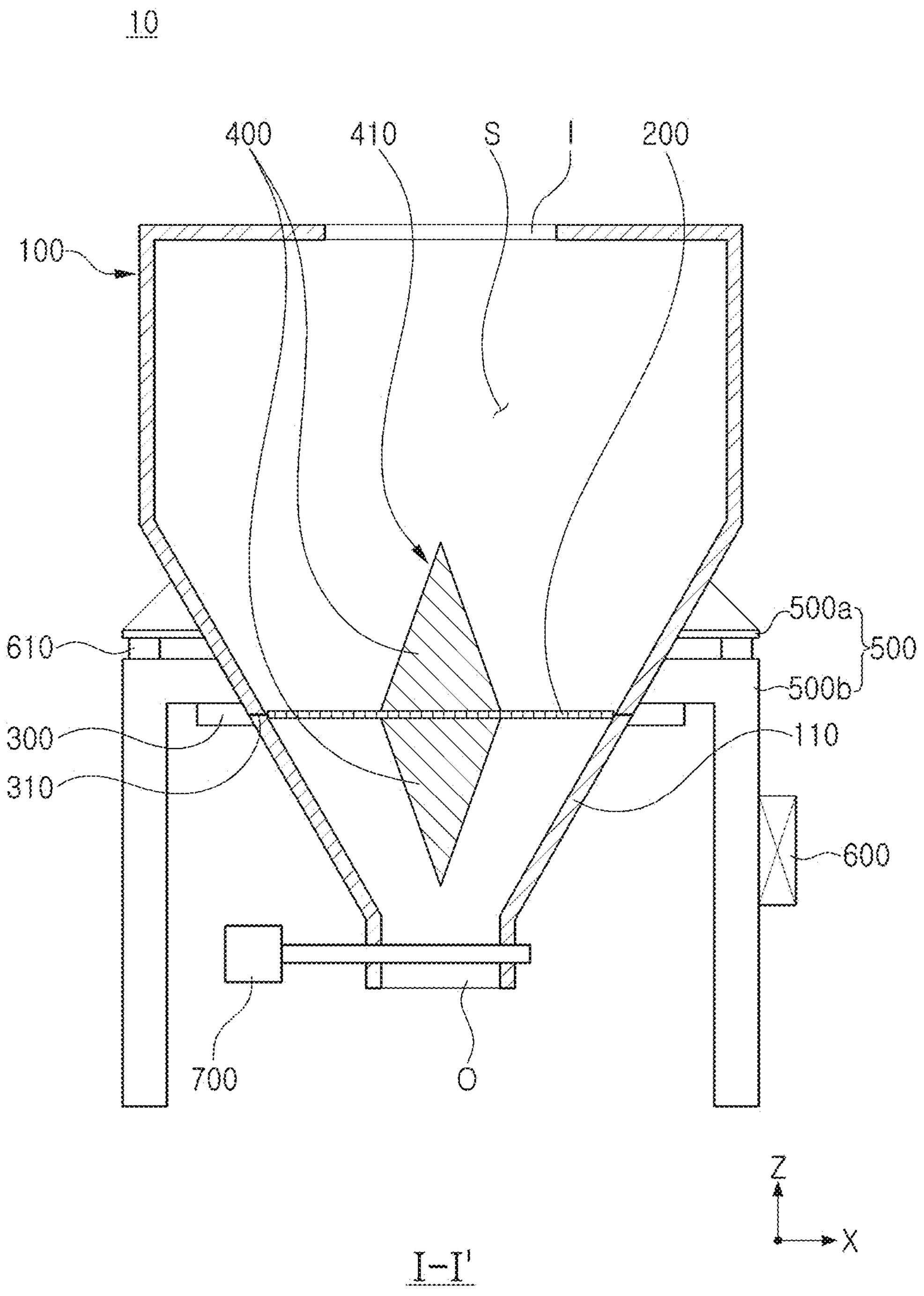
FIG. 3 is a cross-sectional view taken along line I-I' of FIG. 1.

FIG. 2 is a perspective view of an apparatus for discharging powder for a secondary battery according to an embodiment of the present disclosure. FIG. 3 is a cross-sectional view taken along line I-I' of FIG. 1.

First, referring to FIGS. 2 and 3, the apparatus 10 for discharging powder for a secondary battery according to an embodiment of the present disclosure may include a hopper 100, a mesh plate 200, and a vibration transmission unit 300.

The hopper 100 may include an upper surface with an inlet I and a lower surface with a discharge port O. For example, an upper surface of the hopper 100 may have a cylindrical shape, and a portion of a lower surface of the hopper 100 may have a cone shape having a cross-sectional area narrowing downwardly.

An accommodating space S in which powder may be accommodated may be formed inside the upper surface of the hopper 100 and the lower surface of the hopper 100. The hopper 100 may protect and store the powder accommodated therein from an external environment. The powder may be carbon powder used as a negative electrode active material for secondary batteries, and the carbon powder may be artificial graphite or natural graphite. However, without being limited thereto, and slurry, instead of powder, for secondary batteries may be accommodated in the accommodating space S.

The inlet I may be formed in the upper surface of the hopper 100. As an example, the inlet I may be formed on top of the upper surface and may have a circular cross-section. Powder may be introduced into the apparatus 10 for discharging powder for a secondary battery through the inlet I formed in the upper surface of the hopper 100.

The hopper 100 may include a tapered portion 110 having an inner diameter which gradually narrows. For example, the tapered portion 110 may be formed in the lower surface of the hopper 100, and may have the inner diameter decreasing toward the bottom of the hopper 100. The powder accommodated in the accommodating space S of the hopper 100 may move downwardly along the tapered portion 110.

A nozzle (not shown) injecting air into the hopper may be additionally disposed on the lower surface of the hopper 100. The nozzle may be disposed in the tapered portion 110 and inject air into the powder stacked on the inclined portion 410. The powder stacked on the inclined portion 410 may not cluster due to the injected air.

The discharge port O may be formed at the bottom of the hopper 100. The discharge port O may be formed in a lower portion of the tapered portion 110. For example, the discharge port O may be formed in the center of the bottom of the hopper 100 and have a circular cross-section. Powder moving downwardly along the tapered portion 110 may be discharged to the outside of the hopper 100 through the discharge port O.

A valve that can be opened and closed may be connected to the discharge port O. When the valve is opened, powder may be discharged to the outside from the discharge port O. When the valve is closed, powder is not discharged to the outside from the discharge port O.

The mesh plate 200 may be disposed inside the hopper 100. Specifically, the mesh plate 200 may be disposed inside the tapered portion 110. As an example, the mesh plate 200 may be in contact with an internal surface of the tapered portion 110 and may be seated on the tapered portion 110. A shape of the mesh plate 200 is described in detail with reference to FIGS. 4 and 5.

The vibration transmission unit 300 may be disposed outside the hopper 100. The vibration transmission unit 300 may be disposed to contact the hopper 100. As an example, the vibration transmission unit 300 may contact the tapered portion 110 and transmit vibrations to the tapered portion 110. Therefore, vibrations may be transmitted to powder to be disposed to be adjacent to the tapered portion 110, and powder to be located near the tapered portion 110 may not cluster and move to a lower portion of the hopper 100 along the tapered portion 110.

The vibration transmission unit 300 may transmit vibration to the mesh plate 200. The vibration transmission unit 300 may be disposed outside the hopper 100 opposite to the position in which the mesh plate 200 is disposed. The vibration transmission unit 300 may transmit vibrations through the tapered portion 110, and the transmitted vibrations may be transmitted to the mesh plate 200. Accordingly, the mesh plate 200 may vibrate upon receiving vibrations from the vibration transmission unit 300, but the method by which vibrations are transmitted to the mesh plate 200 is not limited thereto.

The mesh plate 200 may be connected to the vibration transmission unit 300 through a separate connection member 310. The mesh plate 200 may vibrate upon receiving vibrations from the vibration transmission unit 300. The connection member 310 may penetrate through a portion of the hopper 100 in order to connect the vibration transmission unit 300 disposed outside the hopper 100 to the mesh plate 200 disposed inside the hopper 100. In order to prevent powder disposed inside the hopper 100 from escaping, a surrounding portion of the connection member 310 of the hopper 100 may be sealed.

At least one guide member 400 may be disposed inside the hopper 100.

The guide member 400 may be disposed to contact the mesh plate 200. The guide member 400 may be disposed on both sides of the mesh plate 200 and may be disposed to protrude from the mesh plate 200 in a first direction. As an example, the guide member 400 may have a cone or truncated cone shape. Accordingly, a cross-sectional area of the guide member 400 may gradually decrease as the guide member 400 protrudes from the mesh plate 200.

The guide member 400 is disposed in the accommodating space S and may guide a moving direction of powder. For example, powder may not move through the guide member 400 and may move through a space in which the guide member 400 is not disposed. Referring to FIG. 2, powder may be moved through space between the guide member 400 and the tapered portion 110.

The guide member 400 may receive vibrations from the mesh plate 200. Accordingly, the guide member 400 may vibrate.

The mesh plate 200 and the guide member 400 may be fixed not to be released while vibrating. For example, the mesh plate 200 may be fixed to the internal surface of the hopper 100, and the guide member 400 may be fixed to the mesh plate 200. The mesh plate 200 and the guide member 400 may be fixed by welding, but are not limited thereto. For example, to fix the mesh plate 200 and the guide member 400, a fixing or combining method that is easy for those skilled in the art may be used.

The hopper 100, the mesh plate 200, and the guide member 400 may be formed of stainless steel, but are not limited thereto. For example, the hopper 100, the mesh plate 200, and the guide member 400 may be formed of a material not reacting with powder for secondary batteries and having a certain strength, such as graphite.

The apparatus 10 for discharging powder for a secondary battery according to an embodiment of the present disclosure may further include a support frame 500 and a controller 600.

The support frame 500 may include a first support frame 500*a* contacting the hopper 100 and a second support frame 500*b* supporting the hopper 100 and the first support frame 500*a*.

The first support frame 500*a* may contact a portion of the hopper 100. As an example, the first support frame 500*a* may have a disk shape with a hole formed therein and may include a flange portion protruding from the disk shape. A plurality of flange portions may be provided and may contact the tapered portion 110 and support the hopper 100.

The second support frame 500*b* may be disposed below the first support frame 500*a* and may support the first support frame 500*a* and the hopper 100. For example, the second support frame 500*b* may contact the vibration transmission unit 300 and a measurement sensor 610 and may fix the vibration transmission unit 300 and the measurement sensor 610.

The measurement sensor 610 measuring the weight of the hopper 100 may be disposed in the first support frame 500*a* and the second support frame 500*b*. The measurement sensor 610 may measure the amount of change in weight of powder accommodated in the hopper 100 and transmit a measurement value to the controller 600. A plurality of measurement sensors 610 may be provided to measure the exact weight of the hopper 100.

The controller 600 may control driving of the vibration transmission unit 300. For example, the controller 600 may control the vibration transmission unit 300 to operate or not operate. The controller 600 may receive the measurement value obtained by measuring the weight of powder accommodated in the hopper 100 from the measurement sensor 610 and determine whether to operate the vibration transmission unit 300 according to the measurement value. For example, if the amount of change in weight of powder accommodated in the hopper 100 is equal to or greater than a certain value, powder is properly discharged through the discharge port O and the controller 600 may prevent the vibration transmission unit 300 from operating. On the contrary, if the amount of change in weight of powder accommodated in the hopper 100 is less than the certain value, powder is not properly discharged through the discharge port O, so the controller 600 may cause the vibration transmission unit 300 to operate to vibrate powder. Therefore, clustered powder may be dispersed by vibrations and discharged through the discharge port O. Referring to FIGS. 2 and 3, the controller 600 may be disposed in contact with the second support frame 500*b*, but the position of the controller 600 is not limited thereto and may vary.

Next, the shapes of the mesh plate 200 and the guide member 400 and the method of moving powder are described with reference to FIGS. 4 and 5.

Figure 4:
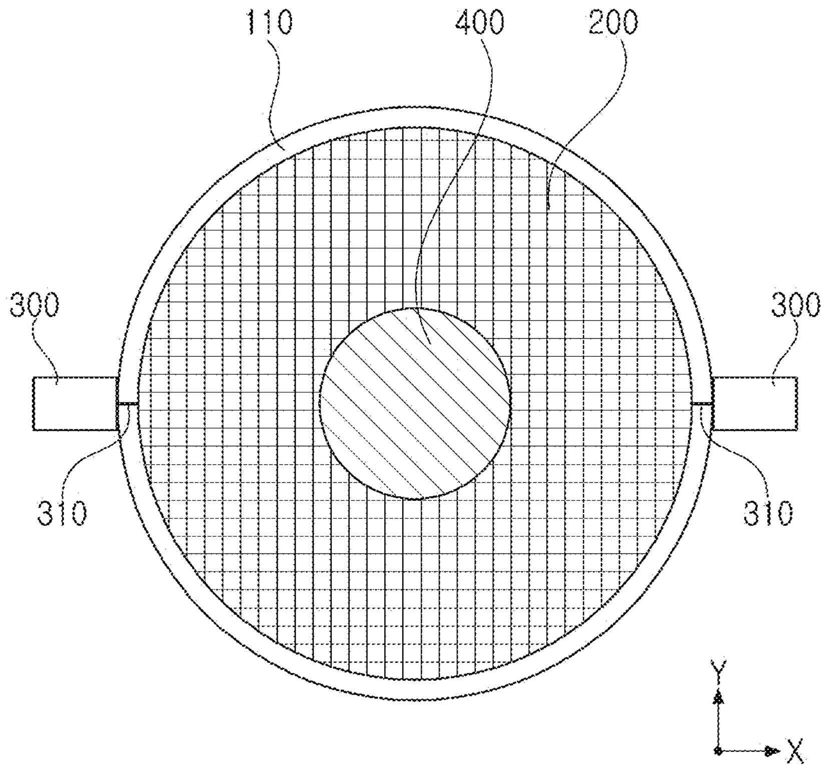
FIG. 4 is a plan view of a mesh plate, a guide member, and a vibration transmission unit of FIG. 2.
Figure 5:
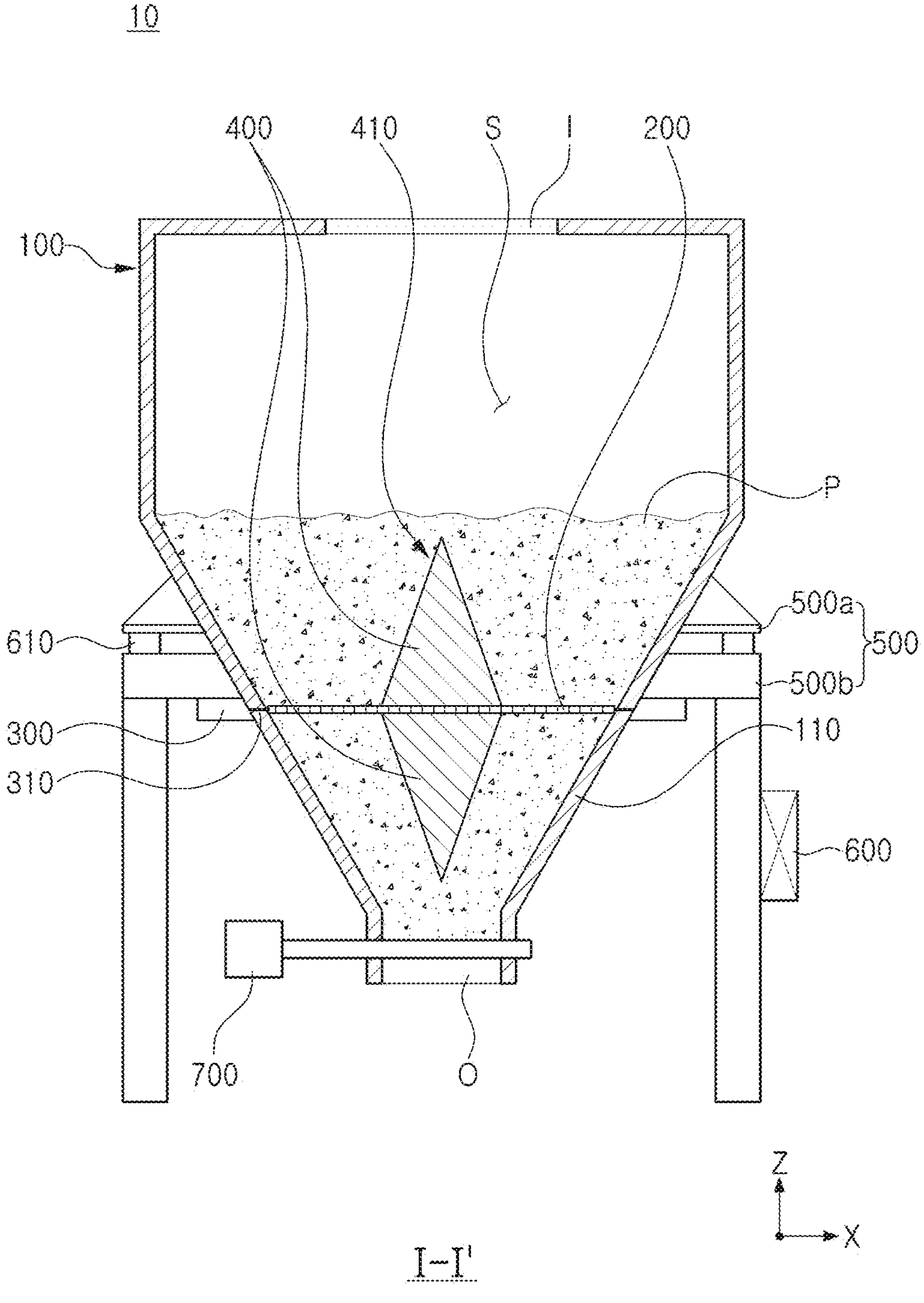
FIG. 5 is a cross-sectional view illustrating a state in which powder is accommodated in the apparatus for discharging powder for a secondary battery of FIG. 3.

FIG. 4 is a plan view of the mesh plate, the guide member, and the vibration transmission unit of FIG. 2. FIG. 5 is a cross-sectional view illustrating a state in which powder is accommodated in the apparatus for discharging powder for a secondary battery of FIG. 3.

The mesh plate 200 may be configured to have a mesh shape, that is, a mesh structure. The mesh shape may be formed in various forms. For example, the mesh plate 200 May be circular but is not specifically limited. For example, the mesh structure may have various shapes, such as a grid, a twist, or a circle, and is not limited to the aforementioned shapes.

One or more mesh plates 200 may be provided. As an example, a plurality of mesh plates 200 may be stacked. The plurality of mesh plates 200 do not have to have the same mesh shape or size, and mesh plates 200 having various mesh shapes may be stacked.

An inclined portion 410 may be formed on an external surface of the guide member 400 to allow the powder P to slide. The inclined portion 410 may spread the powder P located near the center of the internal space of the hopper 100 from the center to the outside. Accordingly, the powder P may move into space located between the inclined portion 410 of the guide member 400 and the internal surface of the tapered portion 110.

According to an embodiment of the present disclosure, a portion of the powder P may move along the guide member 400 and then contact the mesh plate 200. The powder P moving along the guide member 400 may receive vibrations through the guide member 400, and thus, a significant portion of the powder P may not cluster.

Powder P, which has been clustered as vibrations have not been transmitted, may be dispersed while passing through the mesh of the mesh plate 200. Since the mesh plate 200 may also vibrate, a significant portion of the clustered powder P passing through the mesh plate 200 may be dispersed.

As described above with reference to FIG. 1, in the related art, powder located in the center of the internal space of the hopper frequently are stagnant and cluster. In contrast, according to an embodiment of the present disclosure, the mesh plate 200 and the guide member 400 disposed inside the accommodating space S may transmit vibrations to the powder P. Accordingly, the powder P accommodated in the hopper 100 may less cluster and may be smoothly discharged through the discharge port O.

According to an embodiment of the present disclosure having the configuration described above, clustering of powder may be reduced.

According to an embodiment of the present disclosure having the configuration described above, powder may be smoothly discharged.

Only specific examples of implementations of certain embodiments are described. Variations, improvements and enhancements of the disclosed embodiments and other embodiments may be made based on the disclosure of this patent document.

What is claimed is:

1. An apparatus for discharging powder for a secondary battery, the apparatus comprising:

a hopper having an accommodating space in which powder is accommodated and a discharge port through which the powder is discharged;

a mesh plate disposed inside the hopper;

a vibration transmission unit transmitting vibrations to the mesh plate and a controller controlling driving of the vibration transmission unit;

wherein the controller receives a measurement value from a measurement sensor measuring a weight of the powder accommodated in the hopper and operates the vibration transmission unit according to the measurement value.

2. The apparatus of claim 1, further comprising:

at least one guide member disposed in the accommodating space and guiding a moving direction of the powder, wherein the at least one guide member is in contact with the mesh plate to receive vibrations from the mesh plate.

3. The apparatus of claim 2, wherein the at least one guide member is disposed on both sides of the mesh plate.

4. The apparatus of claim 2, wherein the at least one guide member is fixed to the mesh plate.

5. The apparatus of claim 2, wherein the at least one guide member includes an inclined portion formed on an external surface thereof to allow the powder to slide.

6. The apparatus of claim 2, wherein the at least one guide member has a cone or truncated cone shape.

7. The apparatus of claim 2, wherein the at least one guide member includes stainless steel.

8. The apparatus of claim 1, wherein the hopper includes a tapered portion having an inner diameter that gradually narrows, and the discharge port is disposed in a lower portion of the tapered portion.

9. The apparatus of claim 8, wherein the mesh plate is disposed inside the tapered portion.

10. The apparatus of claim 8, wherein the tapered portion is in contact with the vibration transmission unit.

11. The apparatus of claim 10, wherein the tapered portion contacts the mesh plate, and the vibration transmission unit is disposed outside the hopper opposite to a position in which the mesh plate is disposed.

12. The apparatus of claim 9, wherein the vibration transmission unit and the mesh plate are connected through a connection member, and the connection member penetrates through a portion of the hopper.

13. The apparatus of claim 1, wherein a valve opened and closed is connected to the discharge port.

14. The apparatus of claim 1, wherein the mesh plate includes stainless steel.

* * * * *